US012590616B2

(12) United States Patent
Yoshioka

(10) Patent No.: US 12,590,616 B2
(45) Date of Patent: Mar. 31, 2026

(54) COMPOSITE COIL SPRING WITH CARBON AND GLASS FIBER LAYERS

(71) Applicant: MITSUBISHI STEEL MFG. CO., LTD., Tokyo (JP)

(72) Inventor: Jun Yoshioka, Canton, MI (US)

(73) Assignee: MITSUBISHI STEEL MFG. CO., LTD. (JP)

( * ) Notice: Subject to any disclaimer, the term of this patent is extended or adjusted under 35 U.S.C. 154(b) by 975 days.

(21) Appl. No.: 17/601,170

(22) PCT Filed: Jul. 1, 2019

(86) PCT No.: PCT/US2019/040068
§ 371 (c)(1),
(2) Date: Oct. 4, 2021

(87) PCT Pub. No.: WO2021/002837
PCT Pub. Date: Jan. 7, 2021

(65) Prior Publication Data
US 2022/0170525 A1 Jun. 2, 2022

(51) Int. Cl.
*F16F 1/366* (2006.01)
*B29C 53/12* (2006.01)
(Continued)

(52) U.S. Cl.
CPC ............ *F16F 1/3665* (2013.01); *B29C 53/12* (2013.01); *B29C 70/32* (2013.01); *B29K 2063/00* (2013.01);
(Continued)

(58) Field of Classification Search
CPC ... F16F 1/3665; F16F 2238/026; B29C 70/32; B29K 2063/00; B29K 2307/04; B29K 2309/08
See application file for complete search history.

(56) References Cited

U.S. PATENT DOCUMENTS 5,685,525 A 11/1997 Oguri et al.
2012/0071586 A1* 3/2012 Thunhorst .................. C08J 5/06
977/773
(Continued)

FOREIGN PATENT DOCUMENTS

CN 106460985 2/2017
CN 107255130 10/2017
(Continued)

OTHER PUBLICATIONS

International Search Report for International Application No. PCT/US2019/040068 mailed Oct. 16, 2019.

*Primary Examiner* — Robert A. Siconolfi
(74) *Attorney, Agent, or Firm* — Carlson, Gaskey & Olds, P.C.

(57) ABSTRACT

A composite coil spring includes a coil body that extends along a coiled axis. The coil body includes a polymer matrix and, disposed in the polymer matrix, a carbon fiber core and a plurality of fiber layers wrapped around the carbon fiber core in alternating oblique fiber angles to the coiled axis. The fiber layers include, from inside-out starting from the carbon fiber core, at least two consecutive carbon fiber intermediate fiber layers of alternating oblique fiber angles to the coiled axis, immediately followed by at least two consecutive glass fiber intermediate fiber layers of alternating oblique fiber angles to the coiled axis, and immediately followed by a carbon fiber outermost fiber layer.

17 Claims, 3 Drawing Sheets

(51) Int. Cl.

| | | |
|---|---|---|
| B29C 70/32 | (2006.01) | |
| B29K 63/00 | (2006.01) | |
| B29K 307/04 | (2006.01) | |
| B29K 309/08 | (2006.01) | |
| B29L 31/00 | (2006.01) | |

(52) U.S. Cl.
CPC ...... *B29K 2307/04* (2013.01); *B29K 2309/08* (2013.01); *B29L 2031/7732* (2013.01); *F16F 2224/0241* (2013.01); *F16F 2238/026* (2013.01)

(56) References Cited

U.S. PATENT DOCUMENTS

| | | | |
|---|---|---|---|
| 2015/0051315 A1* | 2/2015 | Wang .................. | C09D 179/02 |
| | | | 523/400 |
| 2015/0204404 A1 | 7/2015 | Yoshioka | |
| 2016/0297100 A1* | 10/2016 | Gerakopulos ......... | B29C 41/085 |
| 2017/0058983 A1 | 3/2017 | Jufenbach et al. | |

FOREIGN PATENT DOCUMENTS

| | | |
|---|---|---|
| FR | 2602461 | 2/1988 |
| JP | H04136530 | 5/1992 |
| JP | 2006226327 | 8/2006 |

\* cited by examiner

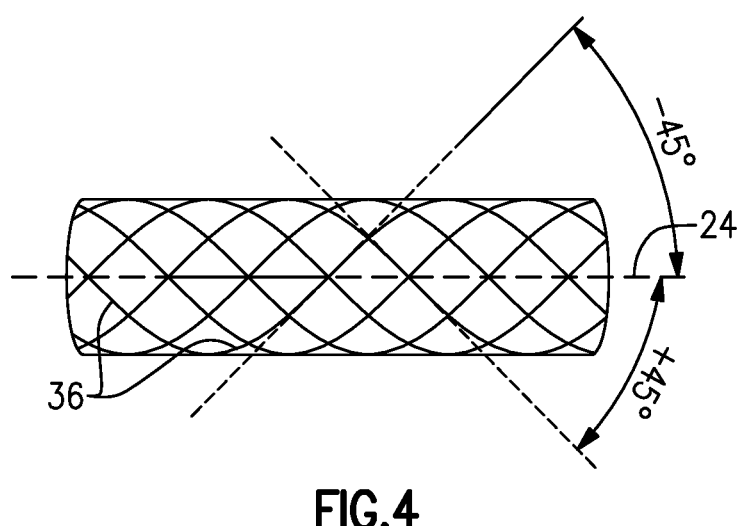
FIG.4
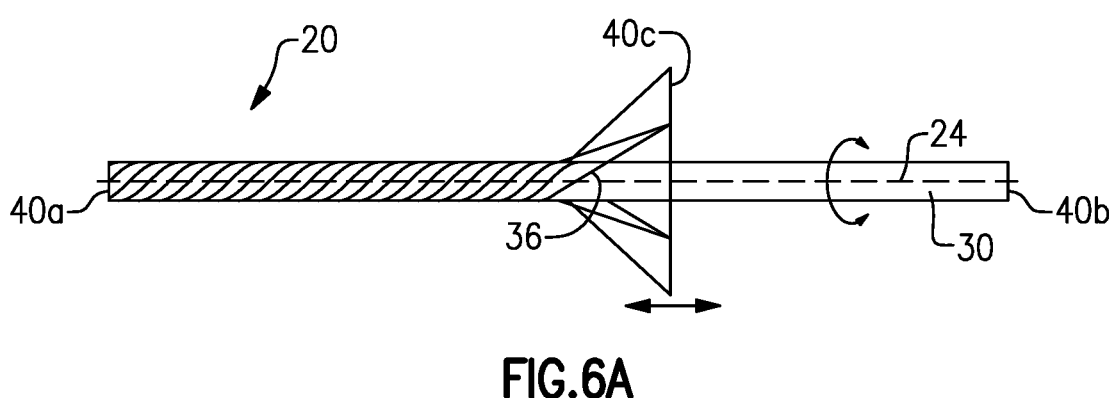
FIG.6A
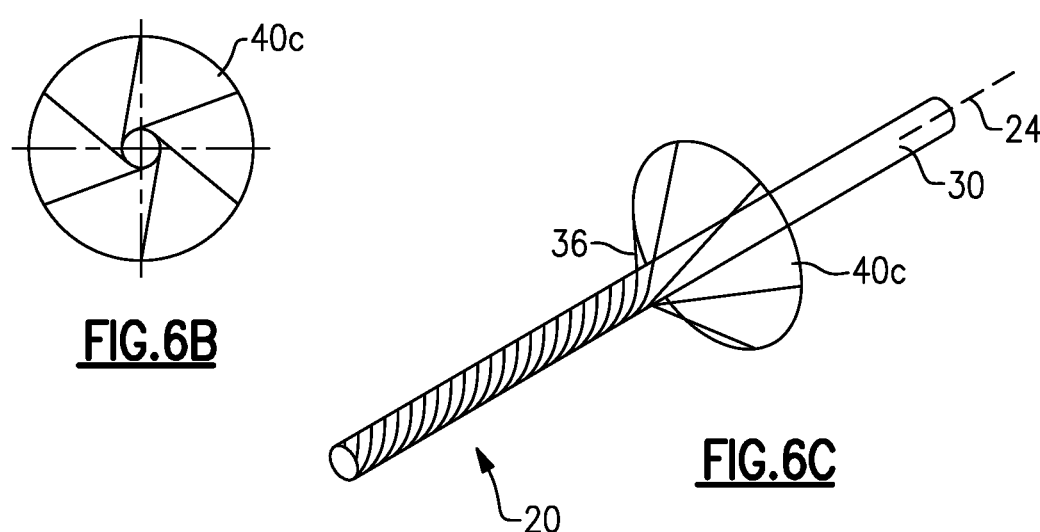
FIG.6B
FIG.6C

COMPOSITE COIL SPRING WITH CARBON AND GLASS FIBER LAYERS

BACKGROUND

Coil springs are known and used in a variety of different applications, such as vehicle suspension systems. A typical coil spring is fabricated of steel to provide mechanical properties, durability, and part size required for such applications. Composite coil springs can be lighter in weight than steel coil springs. Composite coil springs, however, have difficulty matching the combination of mechanical properties, durability, and size of steel coil springs, and at an acceptable cost.

SUMMARY

A composite coil spring according to an example of the present disclosure includes a coil body extending along a coiled axis. The coil body has a polymer matrix and, disposed in the polymer matrix, a carbon fiber core and a plurality of fiber layers wrapped around the carbon fiber core in alternating oblique fiber angles to the coiled axis. The plurality of fiber layers have, from inside-out starting from the carbon fiber core, at least two consecutive carbon fiber intermediate fiber layers of alternating oblique fiber angles to the coiled axis, immediately followed by at least two consecutive glass fiber intermediate fiber layers of alternating oblique fiber angles to the coiled axis, and immediately followed by a carbon fiber outermost fiber layer.

In a further embodiment of any of the foregoing embodiments, the polymer matrix includes a polymer and silica nanoparticles dispersed in the polymer.

In a further embodiment of any of the foregoing embodiments, the polymer matrix includes, by weight, 10% to 25% of the silica nanoparticles.

In a further embodiment of any of the foregoing embodiments, the polymer matrix includes, by weight, 15% to 20% of the silica nanoparticles.

In a further embodiment of any of the foregoing embodiments, each fiber layer of the plurality of fiber layers defines a layer thickness, and the layer thickness of the carbon fiber outermost fiber layer is greater than the layer thickness of each of the carbon fiber intermediate fiber layers.

In a further embodiment of any of the foregoing embodiments, each fiber layer of the plurality of fiber layers defines a layer thickness, and the layer thickness of the carbon fiber outermost fiber layer is greater than the layer thickness of each of the glass fiber intermediate fiber layers.

In a further embodiment of any of the foregoing embodiments, each fiber layer of the plurality of fiber layers defines a layer thickness. The layer thickness of the carbon fiber outermost fiber layer is greater than the layer thickness of each of the carbon fiber intermediate fiber layers and is greater than the layer thickness of each of the glass fiber intermediate fiber layers.

In a further embodiment of any of the foregoing embodiments, the carbon fibers of the carbon fiber intermediate fiber layers and the carbon fibers of the carbon fiber outermost fiber layer define respective tensile moduli, and the tensile modulus of the carbon fibers of the carbon fiber outermost fiber layer is greater than the tensile modulus of the carbon fibers of the carbon fiber intermediate fiber layers.

In a further embodiment of any of the foregoing embodiments, the tensile modulus of the carbon fibers of the carbon fiber outermost fiber layer is greater than the tensile modulus of the carbon fibers of the carbon fiber intermediate fiber layers by a factor of at least 1.25.

In a further embodiment of any of the foregoing embodiments, the polymer matrix includes a polymer and silica nanoparticles dispersed in the polymer.

In a further embodiment of any of the foregoing embodiments, the polymer matrix includes, by weight, 10% to 25% of the silica nanoparticles.

In a further embodiment of any of the foregoing embodiments, the at least two consecutive carbon fiber intermediate fiber layers includes at least three consecutive carbon fiber intermediate fiber layers of alternating oblique fiber angles to the coiled axis.

In a further embodiment of any of the foregoing embodiments, the plurality of fiber layers consists of five of the carbon fiber intermediate fiber layers.

In a further embodiment of any of the foregoing embodiments, the plurality of fiber layers consists of three of the glass fiber intermediate fiber layers.

In a further embodiment of any of the foregoing embodiments, each fiber layer of the plurality of fiber layers defines a layer thickness. The layer thickness of the carbon fiber outermost fiber layer is greater than the layer thickness of each of the carbon fiber intermediate fiber layers and is greater than the layer thickness of each of the glass fiber intermediate fiber layers.

In a further embodiment of any of the foregoing embodiments, the fibers of the carbon fiber core and the plurality of fiber layers comprise, by volume, 38% to 58% of the coil body.

In a further embodiment of any of the foregoing embodiments, the carbon fibers of the carbon fiber intermediate fiber layers and the carbon fibers of the carbon fiber outermost fiber layer define respective tensile moduli, and the tensile modulus of the carbon fibers of the carbon fiber outermost fiber layer is less than the tensile modulus of the carbon fibers of the carbon fiber intermediate fiber layers.

BRIEF DESCRIPTION OF THE DRAWINGS

The various features and advantages of the present disclosure will become apparent to those skilled in the art from the following detailed description. The drawings that accompany the detailed description can be briefly described as follows.

FIG. 4 illustrates alternating fiber orientations.

FIGS. 6A, 6B, and 6C illustrates several views of a winding process for fabricating a coil spring.

DETAILED DESCRIPTION

Figure 1:
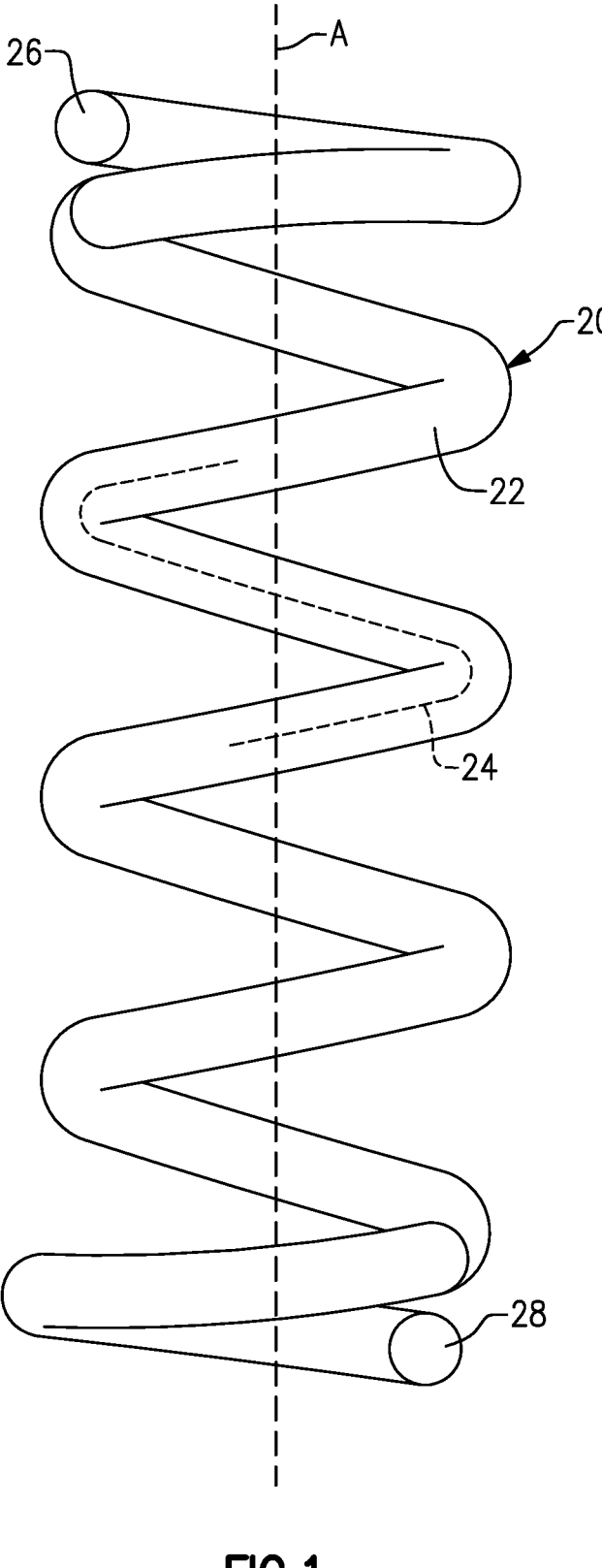
FIG. 1 illustrates an example coil spring.

FIG. 1 shows an example composite coil spring 20 that may be used in a suspension system of a vehicle, for example. It is to be understood, however, that the composite coil spring 20 is not limited to such uses. The composite coil spring 20 may be helical or alternatively have a different coil shape. In this disclosure, a "coil" or variations thereof means a body that curves continuously around a fixed linear axis, such as axis A in FIG. 1. As will be appreciated, the composite coil spring 20 is strong, durable, lightweight, and relatively inexpensive to manufacture.

The composite coil spring 20 includes a coil body 22 that extends along a coiled axis 24 between terminal ends 26/28. Although not shown to scale, the coil spring 20 may have a size and geometry that is adapted for use in vehicle suspension systems. As an example, the coil spring 20 may generally have an axial length of 100 millimeters (mm) to 1000 mm, a diameter of 30 mm to 350 mm, from 3 coil turns to 25 coil turns, and a spring rate of 1 Newton per millimeter (N/mm) to 500 N/mm.

Figure 2:
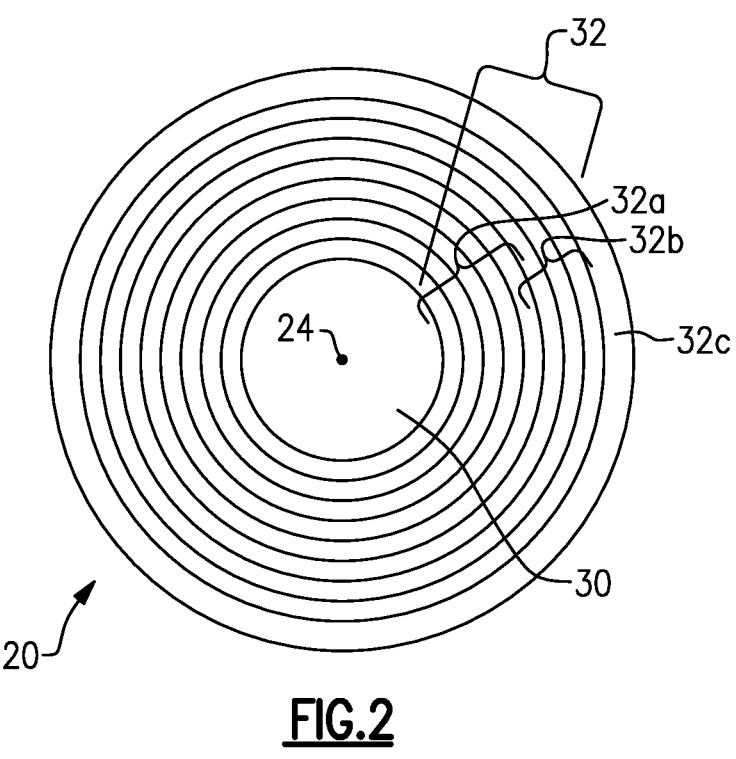
FIG. 2 illustrates a sectioned view through a portion of the coil spring of FIG. 1.
Figure 3:
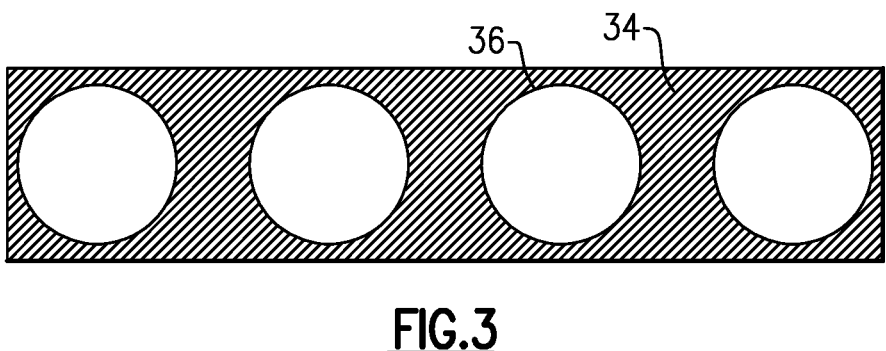
FIG. 3 illustrates a representative sectioned view of a fiber-reinforced polymer matrix composite.

FIG. 2 illustrates a representative sectioned-view of the coil body 22 perpendicular to the coiled axis 24. The coil body 22 includes a carbon fiber core 30 and a plurality of fiber layers 32 that are wrapped around the carbon fiber core 30. The carbon fiber core 30 and fiber layers 32 are formed of fiber-reinforced polymer matrix composite. A representative example of such a composite is depicted in FIG. 3 and includes a polymer matrix 34 and fibers 36 disposed in the polymer matrix 34. Although not shown, each fiber 36 is formed of a bundle of filaments, known as a tow. A single fiber tow may include several thousand filaments. As an example, the coil spring 20 includes, by volume, 38% to 58% of fibers 36, with a remainder being the polymer matrix 34.

As the nomenclature indicates, the fibers of the carbon fiber core 30 are carbon fibers. As will be described in more detail below, the fibers of the fiber layers 32 are either glass fibers or carbon fibers. The fibers of the core 30 and layers 32 are thus embedded, i.e., disposed in, the polymer matrix 34. As an example, the polymer matrix 34 is formed of a thermoset polymer, such as epoxy. An example epoxy available from HEXION is Epon resin 862, diglycidyl ether of bisphenol F with an equivalent weight per epoxide of 165-173 and a density of 1.17 grams per cubic centimeter (g/cm^3), with a cure agent W, non-MDA aromatic amine that has an equivalent weight per epoxide of 42-48 and a density of 1.02 g/cm^3. As cured, this epoxy has an elastic modulus of 2.8 gigapascals (GPa) and a density of 1.15 g/cm^3.

As shown in the representative view in FIG. 4, the fibers 36 of the fiber layers 32 are wrapped around the carbon fiber core 30 in alternating oblique fiber angles to the coiled axis 24. For instance, the fiber angles alternate between +45° and −45°. Although +45-45° is preferred, the fiber angles may alternatively be +/−20-58°.

least two consecutive carbon fiber intermediate fiber layers 32a includes at least three consecutive carbon fiber intermediate fiber layers. In the illustrated example, there are five consecutive carbon fiber intermediate fiber layers 32a and three consecutive glass fiber intermediate fiber layers 32b. As used herein, a "layer" has a uniform radial thickness around the entire layer circumference and all the fibers of a layer are oriented in the same fiber angle.

The types of fibers 36 in the core 30 and in the layers 32 and the relative locations of the layers serve particular functions in the coil spring 20. For instance, the core 30 and consecutive carbon fiber intermediate fiber layers 32a generally reduce weight in comparison to metallic coils and provides bending rigidity to reduce coil spring "bowing." In this regard, carbon fibers of intermediate tensile modulus are used in the core 30 and consecutive carbon fiber intermediate fiber layers 32a. The consecutive glass fiber intermediate fiber layers 32b serve to increase bar diameter to obtain desired spring properties. These layers 32b are also subjected to relatively high transverse strains. In these regards, glass fibers are used in the layers 32b. The outermost fiber layer 32c serves for torsional rigidity. In this regard, carbon fibers of intermediate or high tensile modulus are used in the layer 32c. The composite coil spring made with the combination of carbon fibers and glass fibers described is relatively less expensive than a carbon fibers only composite coil spring.

An example of glass fibers is available from Owens Corning under the designation Advantex glass 2400 TEX (4000 filaments per tow), which has a tensile modulus of 82 GPa, a density of 2.66 g/cm^3, and a nominal fiber diameter of 17 micrometers. An example of intermediate tensile modulus carbon fibers are available from Mitsubishi Chemical Carbon Fiber and Composites under the designation TRH50, which has 18,000 filaments per tow, a tensile modulus of 255 GPa, a density of 1.82 g/cm^3, and a nominal fiber diameter of 6 micrometers. An example of high tensile modulus carbon fibers is available from Mitsubishi Chemical Carbon Fiber and Composites under the designation MS40, which has 12,000 filaments per tow, a tensile modulus of 340 GPa, a density of 1.77 g/cm^3, and a nominal fiber diameter of 6 micrometers. Further properties of these carbon fibers are shown below in Table 1. As will be appreciated, the properties of carbon fibers can vary by grade and supplier.

TABLE 1

| | | | | | | | X-Sectional | | |
| | | | | Density | Yield | | | | Filament |
| Fiber Type | Number of Filaments | Strength Ksi (MPa) | Modulus Msi (GPa) | $lb/in^3$ $(g/cm^3)$ | yds/lb (mg/m) | Denier (Tex) | Area $in^2$ $(mm^2)$ | Elongation % | Diameter μm |
|---|---|---|---|---|---|---|---|---|---|
| TRH50 | 18,000 | 770 (5,300) | 36 (250) | 0.066 (1.82) | 496 (1,000) | 9,000 (1,000) | $8.52 \times 10^{-4}$ (0.549) | 2.1 | 6 |
| MS40 | 12,000 | 640 (4,410) | 50 (345) | 0.064 (1.77) | 825 (600) | 5,400 (600) | $5.30 \times 10^{-4}$ (0.340) | 1.3 | 6 |

Properties of Intermediate and High Tensile Modulus Carbon Fibers.

Referring again to FIG. 2, the fiber layers 32 include, from inside-out starting from the carbon fiber core 30, at least two consecutive carbon fiber intermediate fiber layers 32a of alternating oblique fiber angles to the coiled axis 24, immediately followed by at least two consecutive glass fiber intermediate fiber layers 32b of alternating oblique fiber angles to the coiled axis 24A, and immediately followed by a carbon fiber outermost fiber layer 32c. For instance, the at In general, carbon fibers are available in four designations according to tensile modulus, including standard, intermediate, high, and ultra-high modulus. Standard modulus carbon fiber is rated at about 33 million pounds per square inch (Msi) and intermediate modulus carbon fiber is rated at above 33 Msi up to 42 Msi. High modulus carbon fiber has a rating of at least 42 Msi, and ultra-high modulus carbon fiber is rated beginning at 65 Msi up to about 135 Msi. In general, the modulus arises from how the carbon fibers are manufactured. Most carbon fibers are made from carbon-containing starting material that are aligned in a long plastic string that is then pyrolyzed such that impurities are burned away leaving just carbon atoms. Modifications to the pyrolyzing process produce higher purity strands with higher modulus. High modulus and ultra-high modulus carbon fibers, also known as pitch fiber, starts as a different raw material than standard or intermediate modulus carbon fibers and uses a different manufacturing process. In general, as the purity of carbon fiber increases, cost increases, modulus increases, elongation at fiber break reduces, and strength decreases.

In one additional example of the coil spring 20, all of the carbon fibers, including those in the core 30, the layers 32b, and the outermost fiber layer 32c, are intermediate tensile modulus carbon fibers. A further example is shown below in Table 2.

TABLE 2

| Structure | Fiber material | # of rovings | # of fibers | Fiber angle | Layer Thickness [mm] | Layer cross section area [mm²] |
|---|---|---|---|---|---|---|
| core | Int. CF | 30 | 540,000 | 0 | 3.11 | 30.4 |
| layer 1 | Int. CF | 6 | 108,000 | −45 | 0.41 | 8.6 |
| layer 2 | Int. CF | 6 | 108,000 | 45 | 0.37 | 8.6 |
| layer 3 | Int. CF | 6 | 108,000 | −45 | 0.34 | 8.6 |
| layer 4 | Int. CF | 6 | 108,000 | 45 | 0.31 | 8.6 |
| layer 5 | Int. CF | 6 | 108,000 | −45 | 0.29 | 8.6 |
| layer 6 | GF | 6 | 24,000 | 45 | 0.48 | 15.3 |
| layer 7 | GF | 6 | 24,000 | −45 | 0.44 | 15.3 |
| layer 8 | GF | 6 | 24,000 | 45 | 0.41 | 15.3 |
| outermost layer | Int. CF | 24 | 432,000 | −45 | 0.83 | 34.4 |

In one modified example, the carbon fibers in the core 30 and the layers 32b are intermediate tensile modulus carbon fibers, and the carbon fibers in the outermost fiber layer 32c are high tensile modulus carbon fibers and thus the tensile modulus of the carbon fibers of the outermost fiber layer 32c is greater than the tensile modulus of the carbon fibers of the layers 32b. A further example is shown below in Table 3. In one additional example, the tensile modulus of the carbon fibers of the outermost fiber layer 32c is greater than the tensile modulus of the carbon fibers of the layers 32b by a factor of at least 1.25 up to a factor of about 1.9, subject to the ranges of tensile modulus for intermediate and high tensile modulus carbon fibers described above. In one alternate example, the tensile modulus of the carbon fibers of the outermost fiber layer 32c is less than the tensile modulus of the carbon fibers of the layers 32b by a factor of 1.05 up to a factor of about 1.25, subject to the ranges of tensile modulus for intermediate and high tensile modulus carbon fibers described above.

TABLE 3

| Structure | Fiber material | # of rovings | # of fibers | Fiber angle | Layer Thickness [mm] | Layer cross section area [mm²] |
|---|---|---|---|---|---|---|
| core | Int. CF | 30 | 540,000 | 0 | 3.11 | 30.4 |
| layer 1 | Int. CF | 6 | 108,000 | −45 | 0.41 | 8.6 |
| layer 2 | Int. CF | 6 | 108,000 | 45 | 0.37 | 8.6 |
| layer 3 | Int. CF | 6 | 108,000 | −45 | 0.34 | 8.6 |

TABLE 3-continued

| Structure | Fiber material | # of rovings | # of fibers | Fiber angle | Layer Thickness [mm] | Layer cross section area [mm²] |
|---|---|---|---|---|---|---|
| layer 4 | Int. CF | 6 | 108,000 | 45 | 0.31 | 8.6 |
| layer 5 | Int. CF | 6 | 108,000 | −45 | 0.29 | 8.6 |
| layer 6 | GF | 6 | 24,000 | 45 | 0.48 | 15.3 |
| layer 7 | GF | 6 | 24,000 | −45 | 0.44 | 15.3 |
| layer 8 | GF | 6 | 24,000 | 45 | 0.41 | 15.3 |
| outermost layer | High CF | 24 | 288,000 | −45 | 0.56 | 22.8 |

As demonstrated by the examples above, each layer 32 (e.g., referred to in the tables as "layer 1," "layer 2," etc.) defines a layer thickness. In any of the above examples herein, the layer thickness of the outermost fiber layer 32c may be greater than the layer thickness of each of the fiber layers 32a (e.g., layers 1-5 in the tables) and the layer thickness of the outermost fiber layer 32c may be greater than the layer thickness of each of the fiber layers 32b (e.g., layers 6-8 in the tables).

Figure 5:
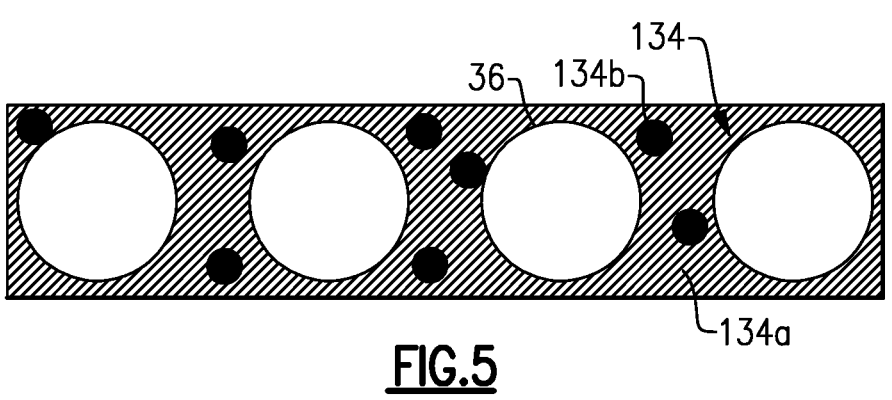
FIG. 5 illustrates a sectioned view of another representative example of a fiber-reinforced polymer matrix composite.

Referring to FIG. 5, the fiber-reinforced polymer composite in further examples of any of the forgoing examples may include a polymer matrix 134. In this disclosure, like reference numerals designate like elements where appropriate and reference numerals with the addition of one-hundred or multiples thereof designate modified elements that are understood to incorporate the same features and benefits of the corresponding elements. In this case, the polymer matrix 134 includes a polymer 134a (e.g., epoxy as discussed above) and silica nanoparticles 134b dispersed in the polymer 134a. For example, the polymer matrix 134 includes, by weight, 10% to 25% of the silica nanoparticles 134b, or more preferably 15% to 20% of the silica nanoparticles 134b. The "nanoparticles" may refer to particles that have an average maximum size of no greater than 100 nanometers. Most typically, however, the size of the silica nanoparticles is from 5 nanometers to 50 nanometers, such as about 20 nanometers.

One example of silica nanoparticles is available from Evonik under the designation of NANOPDX F400, which is a concentrate of epoxy resin with colloidal silica that can be mixed with another epoxy resin in order obtain the desired amount of silica nanoparticles in the final polymer matrix 134. The F400 uses a DGEBA base resin and has an epoxy equivalent weight of 295, a density of 1.4 g/cm^3, and 40% by weight of the silica nanoparticles.

The silica nanoparticles 134b serve to increase the tensile modulus of the polymer matrix 134. As an example, the modulus may be increased by approximately 200%. This increase in the modulus of the polymer matrix 134 causes an increase in the modulus of the composite laminae in the direction transverse to the fibers 36, which results in an increase of the spring rate of the coil spring 20.

Example properties and comparison to a control steel coil spring are shown below in Table 4. In Table 4, Design A is a steel coil spring, Design D is a coil spring according to Table 2 above, and Designs E and F are coil springs according to Table 3 above. The polymer matrix of Design E contains no silica nanoparticles and the polymer matrix of Design F includes approximately 17% by weight of the silica nanoparticles. These designs were analyzed in accordance with a fixed design criteria using finite element analysis software (ANSYS—version 19.2, Static Structural and Composites PrepPost). The composite coil spring design process integrating FEA shows a good correlation to actual composite coil springs. The composite laminae mechanical properties were calculated utilizing well known rule of mixtures based on the fiber volumetric fraction and the fiber and epoxy resin mechanical properties and the calculated mechanical properties of the laminae used as input to the FEA for composites. The fiber volumes of Designs D, E, and F are all between 50% and 51%. To facilitate the comparison, the composite coil springs were designed with the same number of total turns (5.5 turns).

As evident in Table 4, the spring rate of Design F is greater than that of Design E due to the silica nanoparticles. Additionally, each of Designs D, E, and F substantially reduce weight in comparison to Design A, which is steel. Each of Designs D, E, and F are also similar in size to the steel coil spring of Design A, which is represented in Table 4 by inner diameters and bar diameter. The analysis demonstrates that the particular configuration of the carbon fiber core 30, consecutive carbon fiber intermediate fiber layers 32a, consecutive glass fiber intermediate fiber layers 32b, and carbon fiber outermost fiber layer 32c are viable as a replacement to steel coil springs for size and performance, while also substantially reducing weight by approximately two-thirds. Additionally, the coil spring 20 has also demonstrated surprising fatigue resistance performance. Initial results indicate that a coil spring according to Table 2 with the addition of 17% of nanosilica can successfully withstand in excess of one million fatigue cycles in comparison to steel springs that typically fail the same test in 300,000 to 500,000 cycles.

TABLE 4

| Coil spring design Material | | A Steel | D Com- posite | E Com- posite | F Com- posite |
|---|---|---|---|---|---|
| Spring rate | [N/mm] | 24.7 | 24.6 | 24.5 | 26.5 |
| Free height | [mm] | 300 | 300 | 300 | 300 |
| Jounce height | [mm] | 105 | 105 | 105 | 105 |
| Coil spring inner diameter | [mm] | 80 | 80 | 80 | 80 |
| Bar diameter | [mm] | 10 | 14 | 13.7 | 13.7 |
| Total number of turns | | 6.75 | 5.5 | 5.5 | 5.5 |
| Spring mass | [grams] | 1185 | 423 | 387 | 387 |
| % of baseline mass | | 100% | 36% | 33% | 33% |
| Glass fiber | [grams] | 0 | 100 | 99 | 99 |
| Mid modulus carbon fiber | [grams] | 0 | 173 | 116 | 116 |
| Higher modulus carbon fiber | [grams] | 0 | 0 | 33 | 33 |
| Total fiber mass | [grams] | 0 | 273 | 248 | 248 |

FIGS. 6A, 6B, and 6C illustrate an example process for fabricating the coil spring 20 described herein. Each of these figures illustrates the coil spring 20 during the fabrication process. The process is generally a fiber-winding process that utilizes equipment that is adapted to perform such winding. The equipment may include a headstock spindle and the tailstock spindle that rotate synchronously at the same speed, as well as a carriage that moves parallel to the center line of the spindles. The headstock and the tailstock spindles are schematically illustrated at 40a/40b and the carriage at 40c. The fibers 36 are provided from fiber rovings. The fibers 36 may be pre-impregnated with the uncured polymer of the polymer matrix 34/134, or alternatively drawn through a reservoir of the uncured polymer during the process below.

The winding process generally has two stages, including one stage to provide the core 30 and another stage to provide the layers 32. Initially, to lay the core 30, the headstock and the tailstock spindles 40a/40b are stationary. The carriage 40c travels between the headstock and the tailstock spindles 40a/40b to lay the fibers 36 that will form the core 30. These fibers are thus generally unidirectional, although the fibers may have a minor degree of twist. When the carriage 40c travels over the headstock or the tailstock spindles 40a/40b, the fibers 36 engage the headstock or the tailstock spindles 40a/40b. The number of passes back-and-forth between the headstock and the tailstock spindles 40a/40b determines the number of fiber rovings provided for the core 30.

The layers 32 are then wrapped around the fibers 36 of the core 30. To do this, the headstock and the tailstock spindles 40a/40b are rotated in unison. Because the fiber rovings are engaged to the headstock and tailstock spindles 40a/40b, the core 30 rotates with the spindles 40a/40b. The rotation of the core 30 "reels in" the fiber rovings from the carriage 40c as the carriage moves along the core 30 to thereby place the fibers 36 of the layers 32 in the desired fiber angle in relationship to the bar centerline axis, which will eventually become the coiled axis 24A. The motion of the carriage 40c is synchronous with the rotation of the headstock and tailstock spindles 40a/40b so that the resultant fiber placement over the core 30 is in the desired fiber angle. When the carriage 40c travels over the headstock or the tailstock spindles 40a/40b, the fiber rovings engage the headstock or the tailstock spindles 40a/40b. The carriage 40c passes back-and forth from the spindles 40a/40b to produce the desired sequence of fiber layers 32. The movements of the carriage 40c and spindles 40a/40b may be controlled using a computerized controller.

At the end of the wrapping process, the resulting bar is removed from the equipment and placed in a mold cavity. The mold cavity has the net or near-net shape of the coil spring. The mold and the bar is placed in a heating chamber and heated to cure the polymer of the polymer matrix 34/134. As an example, the mold may be a lost core type mold that is removed after the heating process, such as by dissolution in a suitable solvent. Upon curing, the coil spring substantially holds the mold cavity shape. After the removal of the lost core mold, the coil spring assumes the final designed shape and the physical and mechanical properties desired for the coil spring. The shape of the coil spring may change somewhat after removal of the mold due to residual stresses, for example.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A composite coil spring comprising:
    a coil body extending along a coiled axis, the coil body including,
        a polymer matrix and,
        disposed in the polymer matrix, a carbon fiber core and
            a plurality of fiber layers wrapped around the carbon fiber core in alternating oblique fiber angles to the coiled axis, the plurality of fiber layers including, from inside-out starting from the carbon fiber core, at least two consecutive carbon fiber intermediate fiber layers of alternating oblique fiber angles to the coiled axis, immediately followed by at least two consecutive glass fiber intermediate fiber layers of alternating oblique fiber angles to the coiled axis, and immediately followed by a carbon fiber outermost fiber layer.

2. The composite coil spring as recited in claim 1, wherein the polymer matrix includes a polymer and silica nanoparticles dispersed in the polymer.

3. The composite coil spring as recited in claim 2, wherein the polymer matrix includes, by weight, 10% to 25% of the silica nanoparticles.

4. The composite coil spring as recited in claim 3, wherein the polymer matrix includes, by weight, 15% to 20% of the silica nanoparticles.

5. The composite coil spring as recited in claim 1, wherein each fiber layer of the plurality of fiber layers defines a layer thickness, and the layer thickness of the carbon fiber outermost fiber layer is greater than the layer thickness of each of the carbon fiber intermediate fiber layers.

6. The composite coil spring as recited in claim 1, wherein each fiber layer of the plurality of fiber layers defines a layer thickness, and the layer thickness of the carbon fiber outermost fiber layer is greater than the layer thickness of each of the glass fiber intermediate fiber layers.

7. The composite coil spring as recited in claim 1, wherein each fiber layer of the plurality of fiber layers defines a layer thickness, wherein the layer thickness of the carbon fiber outermost fiber layer is greater than the layer thickness of each of the carbon fiber intermediate fiber layers and is greater than the layer thickness of each of the glass fiber intermediate fiber layers.

8. The composite coil spring as recited in claim 1, wherein the carbon fibers of the carbon fiber intermediate fiber layers and the carbon fibers of the carbon fiber outermost fiber layer define respective tensile moduli, and the tensile modulus of the carbon fibers of the carbon fiber outermost fiber layer is greater than the tensile modulus of the carbon fibers of the carbon fiber intermediate fiber layers.

9. The composite coil spring as recited in claim 8, wherein the tensile modulus of the carbon fibers of the carbon fiber outermost fiber layer is greater than the tensile modulus of the carbon fibers of the carbon fiber intermediate fiber layers by a factor of at least 1.25.

10. The composite coil spring as recited in claim 9, wherein the polymer matrix includes a polymer and silica nanoparticles dispersed in the polymer.

11. The composite coil spring as recited in claim 10, wherein the polymer matrix includes, by weight, 10% to 25% of the silica nanoparticles.

12. The composite coil spring as recited in claim 11, wherein the at least two consecutive carbon fiber intermediate fiber layers includes at least three consecutive carbon fiber intermediate fiber layers of alternating oblique fiber angles to the coiled axis.

13. The composite coil spring as recited in claim 11, wherein the plurality of fiber layers consists of five of the carbon fiber intermediate fiber layers.

14. The composite coil spring as recited in claim 13, wherein the plurality of fiber layers consists of three of the glass fiber intermediate fiber layers.

15. The composite coil spring as recited in claim 14, wherein each fiber layer of the plurality of fiber layers defines a layer thickness, wherein the layer thickness of the carbon fiber outermost fiber layer is greater than the layer thickness of each of the carbon fiber intermediate fiber layers and is greater than the layer thickness of each of the glass fiber intermediate fiber layers.

16. The composite coil spring as recited in claim 1, wherein the fibers of the carbon fiber core and the plurality of fiber layers comprise, by volume, 38% to 58% of the coil body.

17. The composite coil spring as recited in claim 1, wherein the carbon fibers of the carbon fiber intermediate fiber layers and the carbon fibers of the carbon fiber outermost fiber layer define respective tensile moduli, and the tensile modulus of the carbon fibers of the carbon fiber outermost fiber layer is less than the tensile modulus of the carbon fibers of the carbon fiber intermediate fiber layers.

* * * * *